(12) United States Patent
Fan et al.

(10) Patent No.: US 7,479,202 B1
(45) Date of Patent: Jan. 20, 2009

(54) BUBBLE-FREE TECHNIQUES FOR BONDING SUBSTRATES

(75) Inventors: Kai Leung Fan, Hong Kong (CN); Ming Sang Yeung, Hong Kong (CN)

(73) Assignees: Anwell Precision Technology (HK) Limited, Hong Kong (HK); Dongguan Anwell Digital Machinery Co., Ltd. (CN)

( * ) Notice: Subject to any disclaimer, the term of this patent is extended or adjusted under 35 U.S.C. 154(b) by 185 days.

(21) Appl. No.: 11/292,919

(22) Filed: Dec. 2, 2005

Related U.S. Application Data

(63) Continuation-in-part of application No. 11/170,022, filed on Jun. 28, 2005, now abandoned.

(51) Int. Cl.
*B29C 65/00* (2006.01)
*B32B 37/00* (2006.01)

(52) U.S. Cl. ............... 156/272.2; 156/64; 156/274.4

(58) Field of Classification Search .......... 156/64, 156/272.2, 272.6, 274.4, 275.5
See application file for complete search history.

(56) References Cited

U.S. PATENT DOCUMENTS

| | | | |
|---|---|---|---|
| 5,098,501 A * | 3/1992 | Nishiguchi | 156/275.5 |
| 6,231,706 B1 * | 5/2001 | Higaki et al. | 156/74 |
| 6,254,716 B1 * | 7/2001 | Russell et al. | 156/286 |
| 6,402,880 B1 * | 6/2002 | Ewerlof et al. | 156/295 |
| 6,613,170 B1 * | 9/2003 | Ohno et al. | 156/64 |
| 2002/0134515 A1 * | 9/2002 | Yamaguchi et al. | 156/379.6 |
| 2003/0000634 A1 * | 1/2003 | Eichlseder | 156/237 |
| 2003/0075267 A1 * | 4/2003 | Shinohara et al. | 156/272.2 |
| 2005/0203504 A1 * | 9/2005 | Wham et al. | 606/34 |

FOREIGN PATENT DOCUMENTS

JP           2003217185 A   *   7/2003

OTHER PUBLICATIONS

Abstract for JP 2003217185 2003.*
Machnie translation for JP 2003217185 2006.*

* cited by examiner

*Primary Examiner*—John L Goff
(74) *Attorney, Agent, or Firm*—Joe Zheng

(57) ABSTRACT

Techniques for producing optical medium that can be read at substantially high speeds with greater stability and accuracy are disclosed. According to one aspect of the techniques, a bonding station is employed with what is referred to as a bubble-free bonding technique that may or may not be incorporated with an index bonding technique. The index bonding is provided to ensure that non-flatness of substrates is compensated when two substrates are bonded together so as to minimize possible dynamic imbalance of a disc. The bubble-free bonding technique is provided to generate an alternating electromagnetic field that eliminates bubbles from a type of glue used to bond two substrates, wherein a high voltage source is used to generate the alternating electromagnetic field of a predefine magnitude.

20 Claims, 4 Drawing Sheets

BUBBLE-FREE TECHNIQUES FOR BONDING SUBSTRATES

CROSS-REFERENCE TO RELATED APPLICATION

This is a continuation-in-part of U.S. application Ser. No. 11/170,022, entitled "Techniques for bonding substrates" and filed Jun. 28, 2005, and by at least one of the co-inventors hereof, now abandoned.

BACKGROUND OF THE INVENTION

1. Field of the Invention

The invention is generally related to the area of optical information recording medium. More particularly, the present is related to bubble-free techniques for bonding substrates and minimizing possible dynamic imbalance.

2. The Background of Related Art

One of the most popular optical storage medium is DVD (Digital Versatile Disc). Technically, DVD is a relatively new generation of optical disc storage technology. It is much larger in data capacity and faster in reading than CD and can hold cinema-like video, better-than-CD audio, still photos, and computer data. DVD aims to encompass home entertainment, computers, and business information with a single digital format. It has replaced laserdisc, is well on the way to replacing videotape and video game cartridges, and could eventually replace audio CD and CD-ROM. DVD has widespread support from all major electronics companies, all major computer hardware companies, and all major movie and music studios. With this unprecedented support, DVD became the most successful storage device of all time in the history of optical storage technologies.

Although blank or content DVD manufacturing is similar to CD manufacturing in that mastering, electroforming (stamper making), molding, metalizing, printing, and testing are required, there are significant differences that include bonding two circular substrates together, additional testing, and the handling of much smaller physical features and specifications. Each of steps in manufacturing DVD requires significant attention in order to increase the product yield and manufacturing speed and, at the same time, reduce the manufacturing costs.

Bonding, for example, is the most sensitive step of the DVD manufacturing process. The importance of this step can not be overemphasized. Improper bonding can create discs that are warped, unbalanced, improperly aligned, have bubbles, etc., all leading to out-of-specification discs that would not be played at the speed required for many applications such as movies and video games. At the very least, trouble in this area could lead to lower production yields and ultimately higher costs and slower delivery. There have been many efforts in bonding techniques to improve the DVD manufacturing process. However, current solutions are not satisfactory, inferior DVD resulted from the bonding step alone can be noticed that the production yield is being diluted.

Therefore there has been a great need for techniques that produce disk-shaped optical medium with minimum errors, improve production speed and reduce costs of the optical medium that can be subsequently read at substantially high speeds with greater stability and accuracy.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for producing optical medium that can be read at substantially high speeds with greater stability and accuracy. According to one aspect of the present invention, a bonding station is employed with what is referred to as a bubble-free bonding technique that may or may not be incorporated with an index bonding technique. The index bonding is provided to ensure that non-flatness of substrates is compensated when two substrates are bonded together so as to minimize possible dynamic imbalance of a disc. The bubble-free bonding technique is provided to generate an alternating electromagnetic field that cause to release bubbles from a type of adhesive (e.g., glue) used to bond two substrates, wherein a high voltage source is used to generate the alternating electromagnetic field of a predefine magnitude.

The present invention may be implemented in software and hardware as method, process, or system. According to one embodiment of the present invention, the present invention is a method for bonding substrates, the method comprises dispensing a certain amount of glue on a first substrate, pushing the first disk and a second substrate towards each other; and applying an alternating source to generate an alternating electromagnetic field that consequently breaks down a surface tension of the glue to release air trapped in the glue.

According to another embodiment of the present invention, the present invention is an apparatus for bonding substrates, the apparatus comprising means for dispensing a certain amount of glue on a first substrate; a lower holder for holding the first substrate; an upper holder for holding a second substrate; an alternating power source applied to generate an alternating electromagnetic field to the first and second substrates when the first and second substrates are pushed towards each other, wherein the alternating electromagnetic field is strong enough to break down a surface tension of the glue so as to release possible bubbles in the glue; and wherein both of the lower and upper holders rotate the first and second substrates at a substantially high speed to spread evenly the glue he first and second substrates by a centrifugal force while the first and second substrates are being compressed for bonding.

One of the objects, features, and advantages of the present invention is to provide techniques of bonding substrates.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

The present invention pertains to techniques for producing optical medium that can be read at substantially high speeds with greater stability and accuracy. An index bonding is provided to ensure that non-flatness of substrates is compensated when two substrates are bonded together so as to minimize possible dynamic imbalance of a disc. A bubble-free bonding is provided to eliminate bubbles from a type of glue used to bond two substrates, wherein a power source is used to generate an alternating electromagnetic field to break down the surface tension of a type of adhesive used to bond the substrates so as to release airs that may have been trapped in the adhesive. Other aspects of the present invention may be appreciated in the following detailed description.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
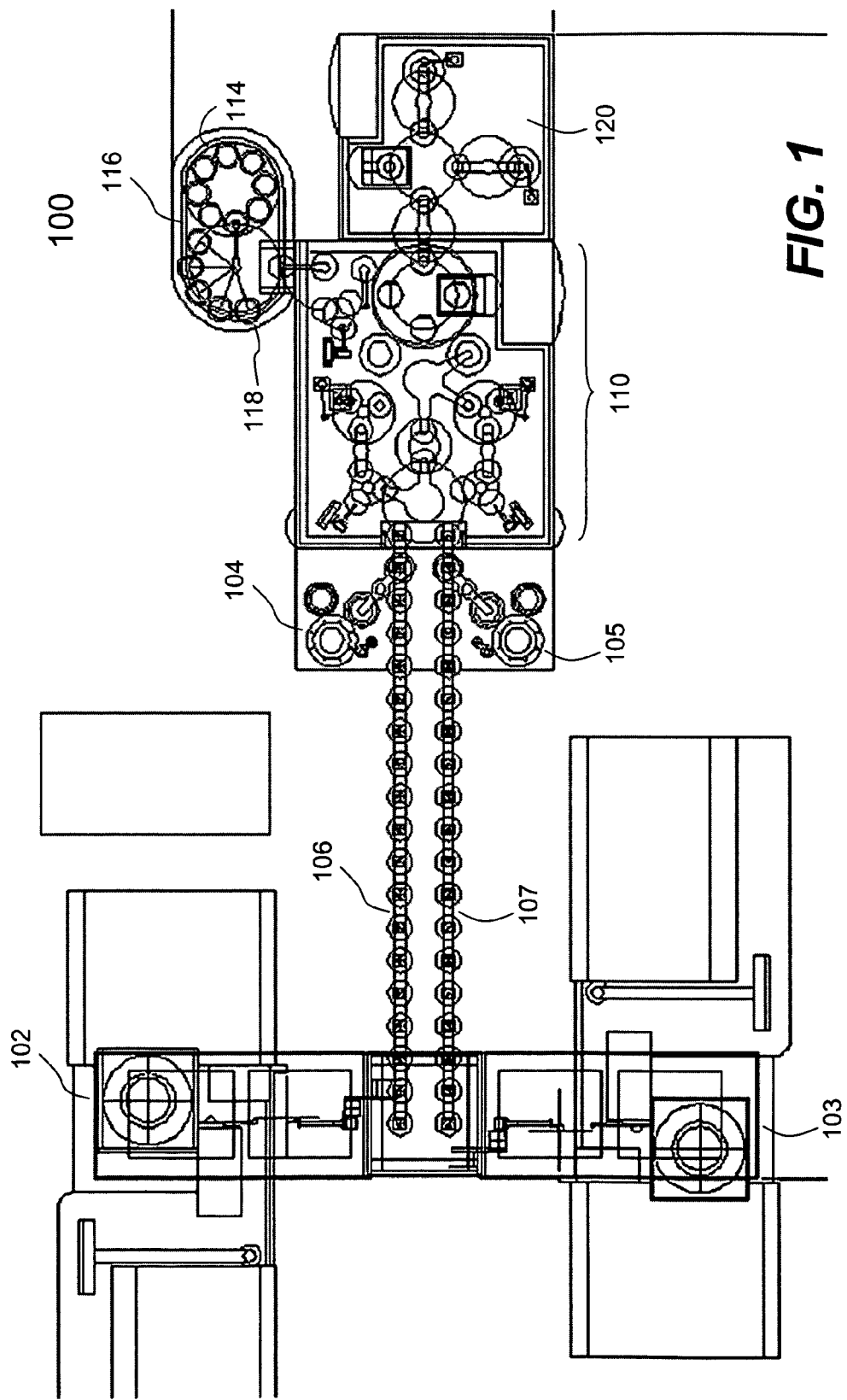
FIG. 1 shows an exemplary configuration in which the present invention may be practiced.

Referring now to the drawings, in which like numerals refer to like parts throughout the several views. FIG. 1 shows an exemplary configuration 100 in which the present invention may be practiced. The configuration 100 may represent a standalone production line or part of a system used to produce optical discs for carrying or storing digital information. As shown in FIG. 1, there are two molding machines 102 and 103, each is configured to produce disk-like substrates from a type of raw material (e.g., polycarbonate). In operation, the molding machines 102 and 103 respectively produce what is referred to as layer 0 and layer 1 substrates or simply L0 and L1 substrates.

Before the L0 and L1 substrates reach two corresponding metalizing stations 104 and 105, each of the L0 and L1 substrates going through a cooling process including two convey belts 106 and 107. In one embodiment, as the L0 and L1 substrates are sequentially produced from the molding machines 102 and 103, they are placed respectively on the convey belts 106 and 107. The moving speeds of the convey belts 106 and 107 may be controlled by a control means (e.g., controller or microprocessor) or programmable via the control means in accordance with the characteristics of the material used to produce the substrates so as to ensure that L0 and L1 substrates are hardened properly before being metalized at stations 104 and 105.

The L0 and L1 substrates are then metalized. In one embodiment, the each of the L0 and L1 substrates is sputtered with one or more reflective materials (e.g., silver, aluminum, gold, or silver alloy). After the L0 and L1 substrates are sequentially metalized at stations 104 and 105, respectively, they are transported to two bonding stations 110, each controlled and operating independently. According to one aspect of the present invention, each of the bonding stations 110 is equipped with what is referred to as a bubble-free technique that may or may not be incorporated with an index bonding technique. As a result, resultant discs by bonding two or more substrates in accordance with the present invention can readily meet the stringent jitter requirements and be read with high speeds with great stability and accuracy.

It should be noted that the configuration 100 is configured to produce discs with two bonded substrates, such as DVD9 (single sided and dual layer). Those skilled in the art can appreciate that the system or configuration 100 is readily expanded to produce more respective substrates at substantially the same time. For example, four respective substrates may be produced and bonded for DVD18 (double sided and dual layer). The detailed description on various aspects of the present invention herein, whenever referring two substrates or the configuration 100, is to facilitate the understanding of the present invention. There is no inherent limitation that the present invention can only be applied to optical medium production involving two substrates or any particularities of the system 100.

The bonding stations 110 also include one or more glue curing means to cure the glue in the discs. One of the examples of the glue curing means is the UV lights. To facilitate the quality control of the discs from the bonding stations 110, two disc buffers 112 and 114 are provided in a disc stocker 116. Depending on implementation, the two disc buffers 112 and 114 may be used to collect discs respectively from the two bonding stations 110 or one of the two disc buffers 112 and 114 is configured to receive good discs and the other one of the two disc buffers 112 and 114 is configured to receive fault discs when a test station 118 is provided. In the case that the two disc buffers 112 and 114 are used to collect discs respectively from the two bonding stations 110, an examination of the discs in the two disc buffers 112 and 114 may dictate which one of the bonding stations may need an attention. In any case, a test station 118 may be provided and configured to determine whether the disc being produced meet specified requirements.

In some cases in which the discs are required to have additional features, such as providing a protective layer on one or both sides of the discs or imprinting image on one side of the discs, one or more optional stations may be attached to the configuration 100. In one embodiment, a station 120 is provided to coat discs from the bonding stations 110 with a protective layer such that the discs are more resistant to possible scratches when in use.

According to one embodiment, one or more cameras (not shown) are provided along the flow of producing the discs. For example, one or more cameras may be positioned to monitor the process of the molding machines 102 and 103, one or more cameras may be positioned to monitor the transporting of the substrates to the metalizing stations 104 and 105, and one or more cameras may be positioned to monitor the bonding stations 110. Further one or more cameras may be provided to monitor other phases of the flow, such as the test station 118 or disc buffers 112 and 114. In any cases, images from the cameras may be viewed on one or more monitors. In one embodiment, the images are digitalized, encoded, compressed and transported via a network to monitors remotely located.

In any case, any dynamic imbalance must be minimized when a disc is read at a very high speed. The dynamic imbalance of a disc happens when the physical center of gravity of the substrate does not align with the geometrical center of the disc. FIG. 2A illustrates a rotation of a disc 300 with thickness variations. When the disc 300 is caused to rotate beyond a certain speed, the physical center 306 of gravity varies around the geometrical center 302 of the disc 300. As shown in FIG. 2A, when the reference mark 304 is on the left side of the disc 300, the physical center 306 of gravity tilts towards left, when the reference mark 304 is on the right side of the disc 300, the physical center 306 of gravity tilts towards right.

When the speed to read the disc increases, the depth of focus of an optical pick-up (OPU) decreases due to a higher numerical aperture (NA). In other words, a higher numerical aperture means a shorter depth of focus, thus requiring a more stable focusing. An optical disc with high dynamic imbalance can appear moving up and down, causing vibration of the drive mechanism in a player, and hence a poor focus and tracking signal would be resulted therefrom. To account for the problem of the dynamic imbalance, the drive mechanism would have to speed down.

One of the important features in the present invention is to minimize the dynamic imbalance of a disc by using what is referred to as index bonding. As two substrates L0 and L1 from two molding machines are subsequently bonded together to form a disc, the two substrates are first rotated against each other by such a degree that the dynamic imbalance is minimized before they are bonded together to form a disc. In one embodiment, one or more sensors (e.g., optical sensors) are used to determine a corresponding profile of each of the two substrates. Given the profiles of the substrates, a rotation angle (i.e., a degree) of one of the two substrates with respect to a reference mark can be determined. In another embodiment, one of the two substrates marked with a reference is rotated against each other gradually, measurements of the dynamic imbalance with respect to each of the rotations are taken. The rotation angle is then determined from the minimum of the measurements.

Figure 2B:
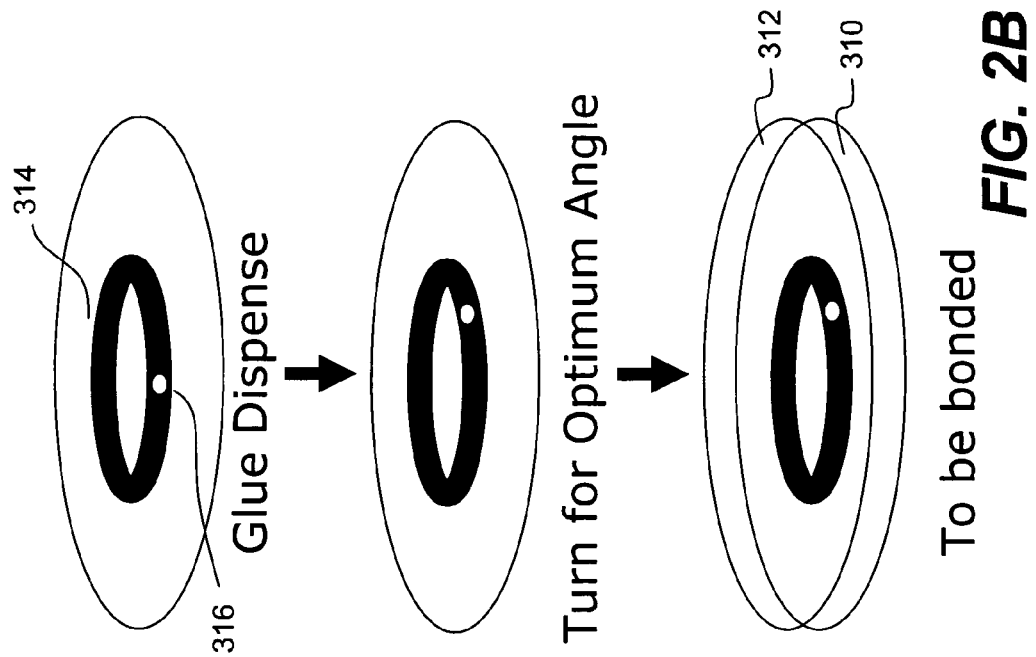
FIG. 2B shows a process of minimizing the dynamic imbalance of a disc comprising two disks.
Figure 2A:
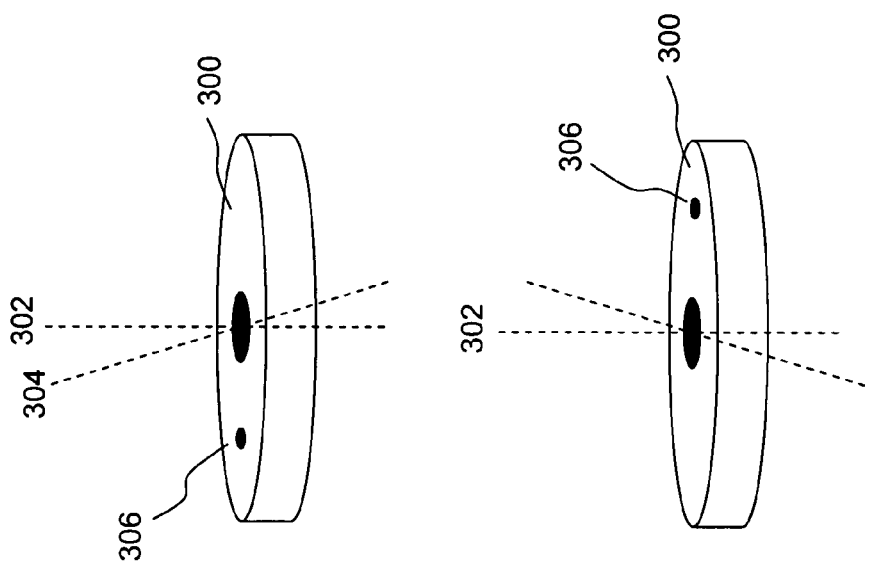
FIG. 2A shows a rotation of a disc with thickness variations.

FIG. 2B shows a process of minimizing the dynamic imbalance of a disc comprising two disks 310 and 312. It is assumed that the disk 310 is marked with a reference point 316. Before the two disks 310 and 312 are bonded with a type of glue 314, the disk 310 is rotated by an angle (e.g., 25.24 degree). In operation, either one or both of the two disks 310 and 312 may be rotated with reference to the other by the angle.

Figure 3:
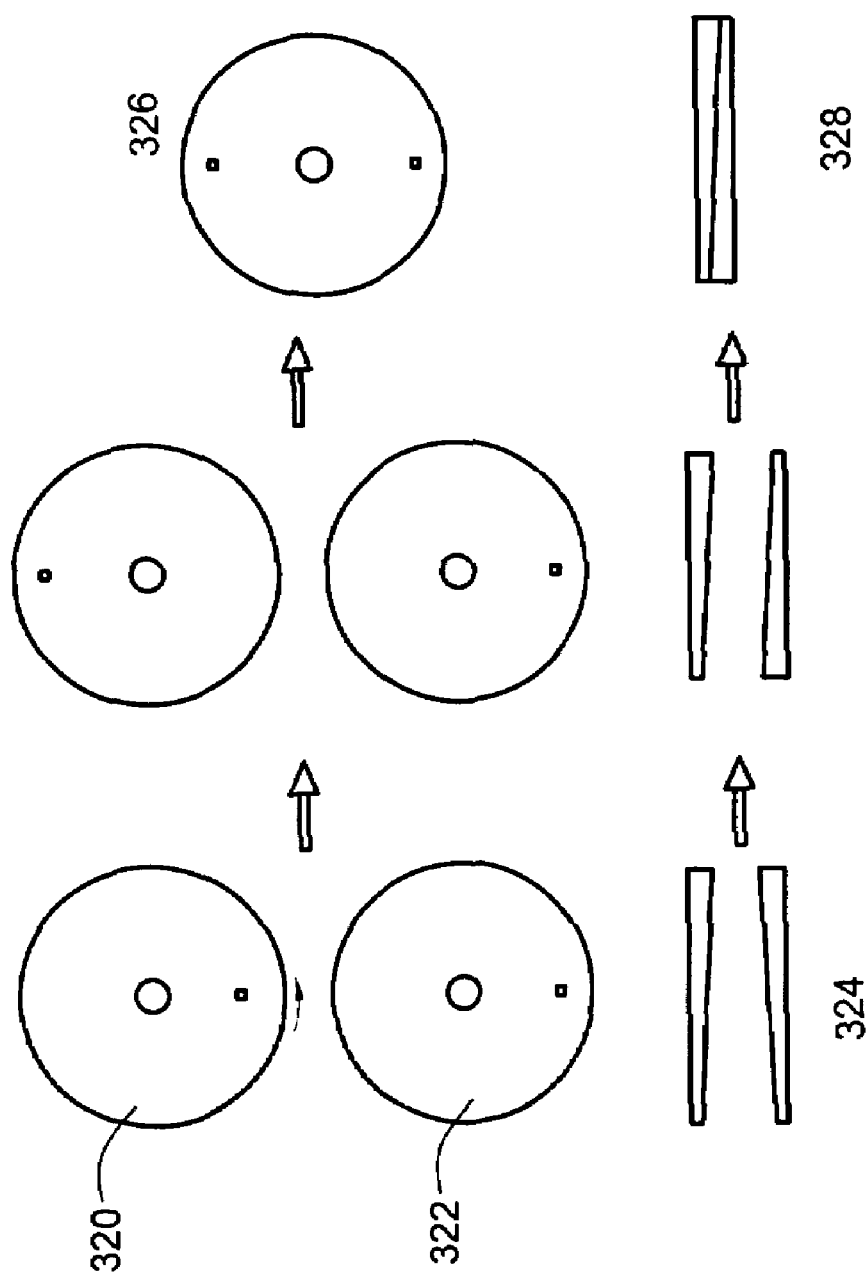
FIG. 3 shows an exemplary situation in which both disks demonstrate the non-flatness of the disks, and corresponding results.

FIG. 3 shows an exemplary situation in which both disks 320 and 322 demonstrate the non-flatness of the disks. If the disks 320 and 322 were to be bonded as is, the dynamic imbalance in the result 324 could be magnified. In accordance with the index bonding as described above, it is assumed that a measurement has determined that a rotation of one of the disks by 180 degree gains a minimum dynamic imbalance. The disk 320 is chosen to rotate by 180 degrees and then bonded with the disk 322 to form a disc 326. As shown in the result 328, the non-flatness of the disks 320 and 322 has been effectively compensated. As a result, the dynamic imbalance of the disc 326, when played in a player, is minimized.

Figure 4:
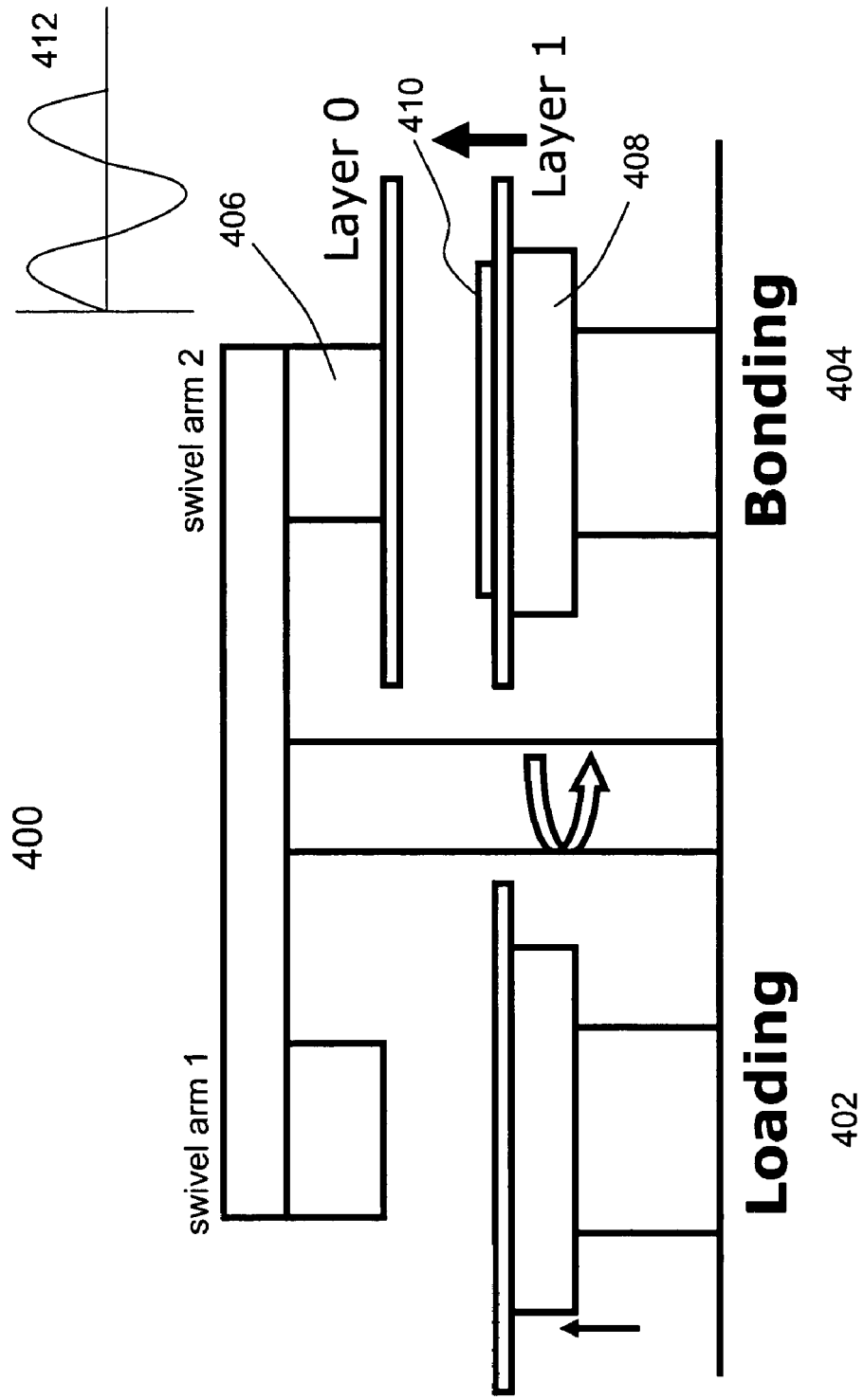
FIG. 4 shows a cross-section view of a configuration according to one embodiment of the present invention.

Referring now to FIG. 4, there shows a cross-section view of a configuration 400 according to one embodiment of the present invention. The configuration 400 may be used alone or as one of the two bonding stations 110 of FIG. 1 and includes a loading part 402 and a bonding part 404. The loading part 402 is configured to load the substrates. For example, these substrates are being transported from either one or both of the two molding stations and deliver an L0 substrate and an L1 substrate to the bonding part 404. As shown in FIG. 4A, the upper holder 406 is holding an L0 substrate and the lower holder 408 is holding an L1 substrate.

The glue 410 is dispensed on the surface of the L1 substrate. In one embodiment, a glue nozzle is positioned above the surface of the L1 substrate and dispenses a type of glue when the lower holder 408, hence the L1 substrate, rotates. As a result, the glue is dispensed circularly and preferably near an inner opening of the disk.

According to one embodiment of the present invention, an alternating electric field is created by an alternating source 412. The alternating source 412 may be of high voltage. The alternating electric field causes to break the surface tension of the glue 410. As known to those skilled in the art that there are many causes that the glue just dispensed includes air bubbles. By using an alternating electric field of a predefined magnitude without applying any pressure, the surface tension of the glue is breaking to release the trapped air from the glue.

Depending on implementation, the alternating electric field may be applied at anytime. In one embodiment, the alternating electric field is applied across the two substrates when the glue is applied or soon after a glue ring is formed on one of the substrates. In another embodiment, the alternating electric field is applied across the two substrates as soon as the other substrate starts to touch the dispensed glue and released after the two substrates are compressed. In still another embodiment, the alternating electric field is applied across the two substrates only after a predefined period right after the glue is dispensed so that the glue has some time to naturally spread out to increase the surface area. After the alternating electric field is applied, the surface tension may be broken down to maximize the release of air bubbles from the glue.

According to one embodiment, while a bonding arm pushes the L1 and L0 substrates towards each other, at the same time the glue 410 is being pressed onto the surface of the L0 substrate, both disks are caused to rotated at a speed adapted to the characteristic of the glue via a control means (e.g., controller or microprocessor) to control the speed. Under the alternating electric field, the glue 410 is evenly spreading outwards due to the centrifugal force.

According to one embodiment, the rotating speed of both disks pertaining to the glue spreading speed is regulated by a servo control via an electric voltage applied thereon. The voltage is controlled and programmable via a set of parameters. Exemplary parameters include a magnitude of the alternating source 412 and a time length the source is applied to.

There are numerous functions, benefits and advantages in the present invention, one of them is that the present invention provides techniques for producing optical discs with minimum dynamic imbalance that can be read at high speeds with great stability and accuracy. Another one of the functions, benefits and advantages in the present invention is the index bonding that provides effective compensation of non-flatness in the disks and minimizes dynamic imbalance. Still another one of the functions, benefits and advantages in the present invention is the bubble-free bonding using an alternating electromagnetic field that effectively eliminates bubbles in the glue so as to provide bubble-free bonding of disks. Other functions, benefits and advantages may be appreciated by those skilled in the art given the detailed description herein.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for bonding substrates, the method comprising:
receiving a first substrate and a second substrate from a convey belt running at a speed being programmed via a first control means in accordance with characteristics of a material used to produce the substrates so as to ensure that first and second substrates are hardened properly;
metalizing at least one of the first and second substrates;
dispensing a certain amount of glue on the first substrate;
pushing the first substrate and the second substrate towards each other; and
applying an alternating source to generate an alternating electromagnetic field that consequently breaks down a surface tension of the glue to release air trapped in the glue;
rotating the first and second substrates at a speed adapted to the characteristics of the glue to spread evenly the glue therebetween by a centrifugal force while compressing the first and second substrates for bonding under the alternating electromagnetic field, wherein said rotating the first and second substrates is controlled by a second control means in accordance with the characteristics of the glue being used; and
providing at least one camera to monitor one or more of said receiving the first substrate and the second substrate from the convey belt, said metalizing at least one of the first and second substrates, and a bonding process including above said dispensing, said pushing, said applying and said rotating processes.

2. The method as recited in claim 1, wherein said applying an alternating source is performed without applying any pressure, the surface tension of the glue is breaking to release any trapped air from the glue.

3. The method as recited in claim 2, further comprising:
rotating one of the first and second substrates by an angle to minimize possible dynamic imbalance of a disc including the first and second substrates.

4. The method as recited in claim 3, wherein the angle is measured from a plurality of pairs of substrates produced respectively from at least two molding stations.

5. The method as recited in claim 3, wherein the angle is so determined that, when the first and second substrates are bonded, possible non-flatness on each of the first and second substrates is compensated.

6. The method as recited in claim 1, wherein the dispensing of the certain amount of glue on the first substrate comprises:
placing the first substrate with its surface facing up; and
dispensing the glue from a fixed glue nozzle on the surface of the first substrate while the first substrate is rotated.

7. The method as recited in claim 6, wherein the pushing of the first substrate and the second substrate towards each other comprises placing the second substrate with its surface facing towards the surface of the first substrate.

8. The method as recited in claim 6, wherein the alternating source is controllable in accordance with one or more of a material used in the first substrate, the second substrate, and the glue.

9. The method as recited in claim 6, wherein images from the one or more cameras are digitalized, encoded, compressed and transported via a network to monitors remotely located.

10. A method for bonding substrates, the method comprising:
receiving a first substrate and a second substrate from a convey belt running at a speed being programmed via a first control means in accordance with characteristics of a material used to produce the substrates so as to ensure that first and second substrates are hardened properly;
metalizing at least one of the first and second substrates;
adjusting the first substrate by an angle with respect to the second substrate to minimize possible dynamic imbalance of a disc including the first and second substrates;
dispensing a certain amount of glue on the first substrate;
pushing the first substrate towards the second substrate during a predefined time to let the dispensed glue to spread naturally;
creating an alternating electromagnetic field to the first and second substrates to break down a surface tension of the glue so as to eliminate possible bubbles in the glue; and
rotating the first and second substrates together at a speed adapted to the characteristics of the glue to spread evenly the glue between the first and second substrates by a centrifugal force while the first and second disks are being bonded by compressing the first and second substrates for bonding under the alternating electromagnetic field, wherein said rotating the first and second substrates together is controlled by a second control means in accordance with the characteristics of the glue being used; and
providing at least one camera to monitor one or more of said receiving the first substrate and the second substrate from the convey belt, said metalizing at least one of the first and second substrates, and a bonding process including above said dispensing, said pushing, and said rotating processes.

11. The method as recited in claim 10, wherein the angle is measured from a plurality of pairs of substrates produced respectively from at least two molding stations.

12. The method as recited in claim 10, wherein the angle is so determined that, when the first and second substrates are bonded, possible non-flatness on each of the first and second substrates is compensated.

13. A method for bonding substrates, the method comprising:
dispensing a certain amount of glue on a first substrate from a glue nozzle positioned above the substrate while keeping the first substrate rotated so that a circular glue ring is formed thereon;
a lower holder for holding the first substrate;
an upper holder for holding a second substrate;
an alternating power source applied to generate an alternating electromagnetic field between the first and second substrates when the first and second substrates are pushed towards each other, wherein the alternating electromagnetic field is strong enough to break down a surface tension of the glue so as to eliminate possible bubbles in the glue,
wherein both of the lower and upper holders rotate the first and second substrates together at a speed adapted to the characteristics of the glue to spread evenly the glue ring outwards from the inner opening by a centrifugal force while the first and second substrates are being compressed for bonding under the alternating electromagnetic field, wherein said rotating the first and second substrates together is controlled by a control means in accordance with the characteristics of the glue being used; and
one or more cameras provided to monitor a bonding process including above said dispensing and said rotating processes, wherein images from the one or more cameras are digitalized, encoded, compressed and transported via a network to monitors remotely located.

14. The method as recited in claim 13, wherein
- the lower holder is driven to rotate the first substrate by an angle to minimize possible dynamic imbalance of a disc including the first and second substrates; or
- the upper holder is driven to rotate the second substrate by an angle to minimize possible dynamic imbalance of a disc including the first and second substrates.

15. The method as recited in claim 14, wherein the angle is measured from a plurality of pairs of substrates produced respectively from at least two molding stations.

16. The method as recited in claim 14, wherein the angle is so determined that when the first and second substrates are bonded, possible non-flatness on each of the first and second substrates is compensated.

17. The method as recited in claim 13, wherein the means for dispensing the certain amount of glue on the first substrate comprises;
- a fixed glue nozzle dispensing the glue on a surface of the first substrates placed facing up while the first substrate is rotated on the lower holder.

18. The method as recited in claim 17, wherein the alternating power source is controlled by a set of parameters, some of the parameters determine a time period and a magnitude of the alternating electromagnet field.

19. The method as recited in claim 14, further comprising curing the glue by a curing means.

20. The method as recited in claim 19, further comprising:
- providing a disc test stage configured to check quality of discs sequentially after the discs are sequentially cured through the curing means;
- providing two disc buffers, one configured to receive the discs qualified as good ones by the disc test stage, the other configured to receive the discs disqualified as fault ones by the disc test stage.

* * * * *